United States Patent [19]

Astle

[11] 4,169,396
[45] Oct. 2, 1979

[54] ELBOW MANDREL ARRANGEMENT
[75] Inventor: William H. Astle, Rancho Cordova, Calif.
[73] Assignee: Tri Tool, Inc., Placerville, Calif.
[21] Appl. No.: 883,178
[22] Filed: Mar. 3, 1978
[51] Int. Cl.² ............................ B23B 3/00; B23B 3/22
[52] U.S. Cl. ..............................................82/1C; 82/4C; 269/48.1; 408/80
[58] Field of Search .......................... 82/4 R, 4 C, 1 C; 408/80, 81, 82, 83; 51/241 VS; 269/47, 48.1

[56] References Cited

U.S. PATENT DOCUMENTS

| 2,478,318 | 8/1949 | Payne | 82/4 C |
| 4,050,836 | 9/1977 | Anders | 408/80 |

FOREIGN PATENT DOCUMENTS 198621  6/1923  United Kingdom ...................... 82/4 R Primary Examiner—Harrison L. Hinson
Attorney, Agent, or Firm—Don B. Finkelstein

[57] ABSTRACT

A mandrel arrangement for mounting a pipe machining tool for rotation relative to at least one end of a pipe elbow or other bend to be machined. A mandrel frame is provided with first and second flange portions having outer surfaces located within planes which intersect to form a predetermined angle approximately equal to the angle of the pipe bend. The frame is adapted to be positioned within the pipe bend with an outer surface of the first flange portion adjacent a first end of the pipe bend and an outer surface of the second flange portion adjacent a second end of the pipe bend. A locking means connected to the mandrel frame is adjustable between a first radially retracted condition in which the frame is free to move relative to the pipe, and a second radially extended condition in which the frame exerts an outward force against the interior of the pipe to frictionally retain the frame from movement relative thereto. A mandrel shaft means adapted to receive the pipe machining tool for relative rotation about its axis is adjustably mountable to the first flange portion such that the mandrel shaft means extends perpendicularly from the outer surface thereof and is adjustable between a plurality of positions adjacent the center of the first end of the pipe bend. The mandrel shaft means may thus be adjusted to coincide with the center of the first end of the pipe bend to receive the pipe machining tool for relative rotation thereabout. The mandrel shaft means may be similarly adjustably mountable to the second flance portion to allow machining of the two ends of the pipe bend relative to axes which intersect to form an angle equal to the predetermined angle.

28 Claims, 7 Drawing Figures

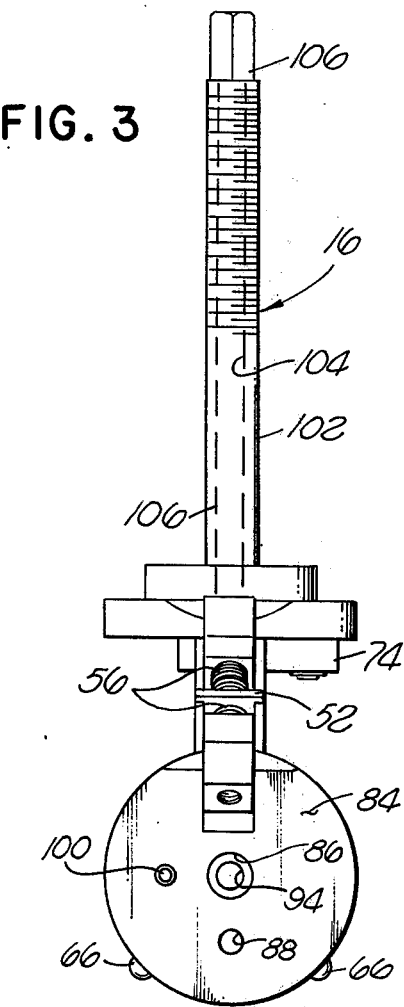
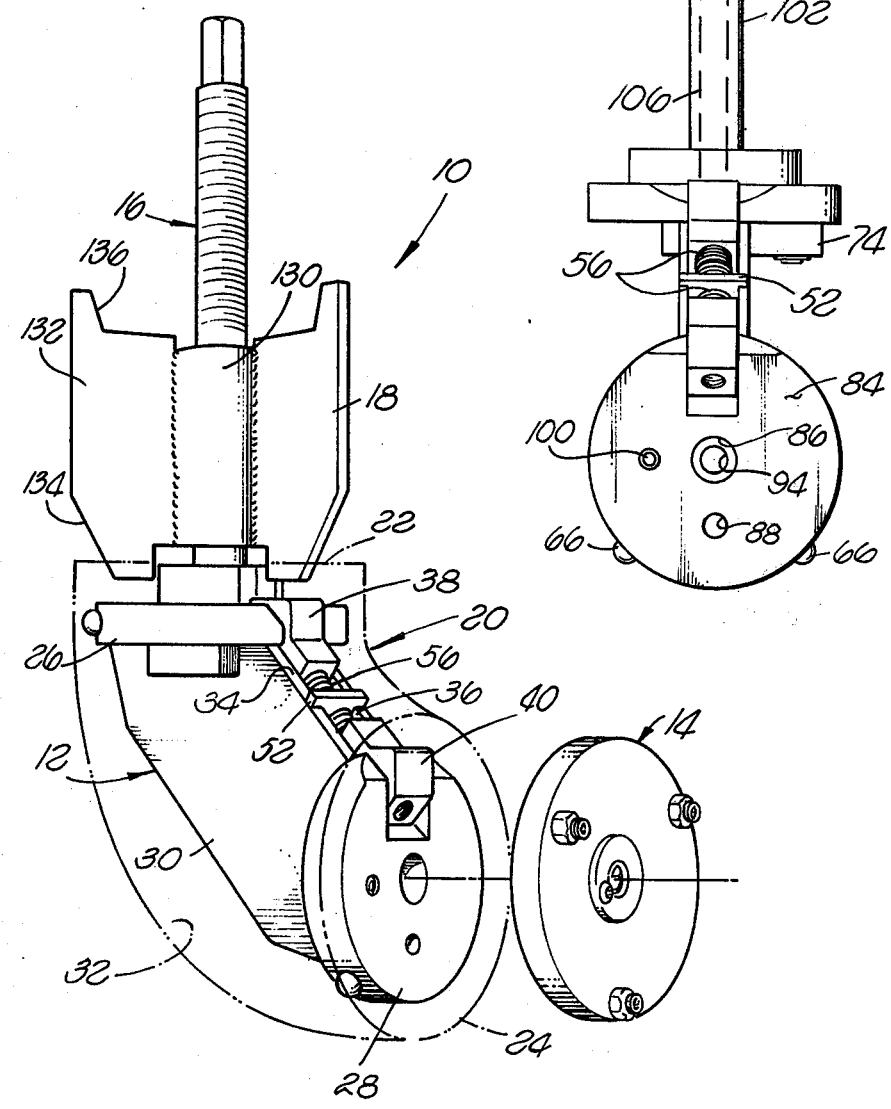

ELBOW MANDREL ARRANGEMENT

BACKGROUND OF THE INVENTION

1. Field of the Invention

This invention relates to the pipe machining art and more particularly to an improved mandrel arrangement useful in mounting a pipe machining tool for rotation relative to at least one end of a pipe bend to be beveled or otherwise machined.

2. Description of the Prior Art

Many pipe machining tools are designed to be rotated about the center line of a pipe to accomplish a machining operation on the pipe. Two examples thereof are described in U.S. Pat. No. 3,875,832, issued Apr. 8, 1975 entitled Manual Pipe Bevelling Tool and U.S. Pat. No. 3,927,584 issued Dec. 23, 1975 entitled Pipe End Facing and Grooving Machine. U.S. Pat. No. 3,875,832 discloses a manual tool to be rotated about the axis of a pipe adjacent its end for the purpose of cutting a bevel thereon. U.S. Pat. No. 3,927,584 discloses a tool the cutting assembly of which is adapted to rotate about the axis of a pipe to machine a square face and an external annular groove on the end of the pipe for the reception of a pipe coupling element.

In tools of this type, a mandrel is required to mount the tools for rotation. Since the mandrel shaft must be coaxial with the pipe being machined, it is easiest to mount the mandrel arrangement directly to the pipe. Such mandrels must be extremely rigid to provide an accurate cut and to withstand the substantial forces placed thereon, but should also be able to be installed and removed easily relative to a particular length of pipe. The ease of installation and removal is particularly important for use in the field, where pipes are machined with a minimum of sophisticated tools and alignment mechanisms. A mandrel must also be relatively inexpensive to justify extensive field use.

Mandrels exist for use with straight sections of pipe, but I am not aware of any mandrel which is truly satisfactory for use in machining pipe elbows or other bends. U.S. Pat. Nos. 3,875,832 and 3,927,584 illustrate mandrels for use with straight sections of pipe comprising a plurality of longitudinally directed radial fins which may be expanded by tightening an axial draw bar, drawing those fins over a set of radially inclined camming surfaces. The radially outer edges of the fins may thus be caused to engage the inner surface of the pipe in a clamping relationship to rigidly fix the draw bar along the axis thereof. Either the draw bar itself or a hollow bar fitted thereover serves as a mandrel for rotation of the pipe machining tool.

The above-described mandrels are unsatisfactory for use in machining the ends of pipe elbows and other pipe bends because pipe bends generally do not possess the length of straight pipe necessary to engage and retain an expanding fin arrangement. The curved inner surfaces of pipe bends present unique and previously unsolved problems in securing a mandrel. Mandrels for such use must be accurately and rigidly mountable within a pipe bend, and must also be of a simple design allowing quick and easy installation.

SUMMARY OF THE INVENTION

Accordingly, it is an object of the present invention to provide an improved mandrel arrangement for mounting a pipe machining tool for axial rotation relative to an open end of a pipe bend.

It is another object of the present invention to provide an improved mandrel arrangement which may be fitted within a pipe bend and easily aligned and secured in place relative thereto.

It is yet another object of the present invention to provide a rigid mandrel arrangement for use in machining a pipe bend, which mandrel arrangement is of a simple design and is relatively inexpensive to manufacturer.

It is a further object of the present invention to provide an improved mandrel arrangement for mounting a pipe machining tool for rotation relative to a pipe bend having two open ends such that the two open ends are machined about two axes, respectively, having a precise angular relationship relative to each other.

It is a further object of the present invention to provide an improved mandrel arrangement for mounting a pipe machining tool for rotation relative to a pipe bend having one open end and a second end connected to a run of pipe such that the one open end is machined about an axis having a precise angular relationship relative to the axis of the run of pipe.

The above and other objects of the present invention are acheived, in the preferred embodiment, by providing a mandrel frame which may be fitted within a pipe bend and secured relative thereto to mount a mandrel shaft projecting outward from one end of the pipe bend.

The frame is provided with first and second flange portions fixed thereto and having outer surfaces which are located within planes that intersect to form an angle equal to that of the pipe bend. The frame is adapted to be positioned within the pipe bend with the outer surface of the first flange portion adjacent to a first end of the pipe bend and the outer surface of the second flange portion adjacent to a second end of the pipe bend. The frame is provided with a locking means connected thereto and adjustable between a first radially retracted condition in which the frame is free to move relative to the pipe bend, and a second radially extended condition in which the frame exerts an outward force against the interior of the pipe bend to frictionally retain it against movement relative thereto.

A mandrel shaft means adapted to receive a pipe machining tool for axial rotation relative thereto is mounted to the frame such that the mandrel shaft means extends perpendicularly outward from the outer surface of the first flange portion and is adjustable between predetermined positions adjacent and including the center of the first end of the pipe bend. The mandrel shaft means may therefore be adjusted to coincide with the center of the first end of the pipe bend to receive a pipe machining tool for rotation thereabout.

The mandrel shaft means may be adjustably mounted to the frame through an axial threaded portion of the shaft means which engages a first captive nut located within the frame adjacent the first flange portion. The captive nut is restrained by the frame portion against movement relative thereto, except essentially translational movement between various radial locations corresponding to the predetermined positions of the mandrel shaft means. The mandrel shaft means is therefore movable between those positions for the axial threaded portion thereof in an engaged but untightened condition with the captive nut, and is fixed in one of those positions for the axial threaded portion of the mandrel shaft means in a tightened condition.

A simple centering unit may be used to position the mandrel shaft means along the center line of the first end of the pipe bend before tightening it in place. The centering unit may include at least three radial vanes extending longitudinally of a bearing element adapted to slidingly engage the mandrel shaft means. Each such vane may be provided with a longitudinal taper adapted to engage the first end of the pipe bend in a centering relationship for the fully engaged condition of the centering unit relative to the mandrel shaft means.

A locating plate removably attachable to the second flange portion may be provided to abut the second end of the pipe bend from a point outside the bend to rigidly locate the mandrel frame relative thereto. The locating plate may be generally circular in shape and include a plurality of projections which are adjustable in length and are positioned to space a portion of the generally circular locating plate a desired distance from the second end of the pipe bend. The orientation of the frame relative to the second end of the pipe may thus be varied somewhat to adjust to a badly framed fitting by adjusting the lengths of the projections.

The locking means used to fix the mandrel frame relative to the pipe bend may comprise a screw thread mechanism adapted to force at least one movable locking element against the interior of the bend. The screw thread mechanism may include a pair of movable locking elements connected by a single bolt for actuation of the locking elements in opposite directions for engagement with the pipe bend. The bolt may extend between the two flange portions such that the angles formed between the axis of the bolt and first flange portion is similar to that formed between the axis of the bolt and the second flange portion.

A second captive nut identical to the first captive nut may be located within the mandrel frame adjacent the second flange portion. The second captive nut is restrained against relative movement, except a limited amount of essentially translational movement between various radial locations corresponding to predetermined positions of the mandrel shaft means relative to the center of the second end of the pipe bend. The mandrel shaft means may therefore be disengaged from the first flange portion and engaged with the second flange portion in a position which coincides with the center of the second end. This may be accomplished without unlocking the frame from the pipe bend. The locating plate may be secured by a central bolt engagable with the two captive nuts. After one end of a particular pipe bend has been machined using the mandrel of the instant invention, the locating plate may be removed and the mandrel shaft means applied to the second flange portion. The mandrel shaft means is then centered with the centering unit and used to machine the second end of the pipe bend. The mandrel arrangement of the instant invention therefore enables both ends of a pipe bend to be beveled or otherwise machined without removing or relocating the frame. The cuts thus produced are precisely oriented relative to each other.

The mandrel shaft means may include a radial flange adjacent the axial threaded portion and adapted to insure the perpendicularity of the mandrel shaft means relative to the outer surface of the flange portion to which it is attached. A pin projecting downward from the lower surface of the radial flange may be provided to engage openings in the outer surfaces of the first and second flange portions to prevent the mandrel shaft means from rotating after assembly.

In use, the frame is first fitted into the pipe bend such that the first and second flange portions are adjacent to the planes which include the first and second ends, respectively, of the pipe bend. The locating plate is then attached to the second flange portion of the frame and positioned flush with the second end of the pipe bend. The mandrel frame is locked in this position by rotating the locking bolt. At this point, the frame is rigidly fixed within the pipe bend with its first flange portion adjacent to the first end of the pipe bend and its second flange portion adjacent to the second end of the pipe bend. The threaded section of the mandrel shaft means is then loosely engaged with the first captive nut. The mandrel shaft means thus projects perpendicularly from the first flange portion, and is movable radially relative thereto between the predetermined positions adjacent to the center of the first end of the pipe bend. Sliding the centering unit over the mandrel shaft means and against the first end of the pipe bend urges the mandrel shaft means to the center of the first end. The mandrel shaft means may be locked in this position by tightening the axial threaded portion relative to the captive nut. The mandrel shaft means is then properly aligned and secured for use to mount a pipe machining tool for rotation relative thereto. If it is also desired to machine the second end of the pipe bend, the locating plate may be removed from the second flange portion and the mandrel shaft means installed thereon. Alignment and tightening of the mandrel shaft means relative to the second end of the pipe bend is accomplished by again sliding the centering unit over the mandrel shaft means and tightening the axial threaded portion thereof. This procedure enables both ends of the pipe bend to be easily and accurately machined for a single placement of the mandrel frame within that pipe bend, resulting in machined surfaces which are precisely oriented relative to each other.

The mandrel arrangement of the instant invention may also be used to machine an end of a pipe bend whose other end has been welded to a run of pipe. In this case, the frame is fitted within the pipe bend with the mandrel shaft means in place thereon such that the mandrel shaft means projects outward from the open end of the pipe bend. The mandrel shaft is aligned within a plane perpendicular to the run of pipe with the aid of a squaring guage fitted to the run of pipe. Alignment in the direction perpendicular to that plane is accomplished with a spirit level.

The mandrel arrangement of the instant invention may therefore be easily and accurately installed within a given pipe bend with a minimum of effort or tools. This is made possible by its uniquely simple construction and alignment mechanisms, making the arrangement well suited to use in the field. The mandrel shaft is also extremely well secured within the pipe bend after installation.

BRIEF DESCRIPTION OF THE DRAWINGS

The above and other objects of the present invention may be more fully understood from the following detailed description taken together with the accompanying drawings wherein similar reference characters refer to similar elements throughout and in which:

FIG. 1 is a partially exploded perspective view of one embodiment of the present invention installed in a pipe elbow;

FIG. 3 is a front elevational view of the device shown in FIG. 1 with the centering unit and locating plate removed;

DESCRIPTION OF THE PREFERRED EMBODIMENTS

Figure 4:
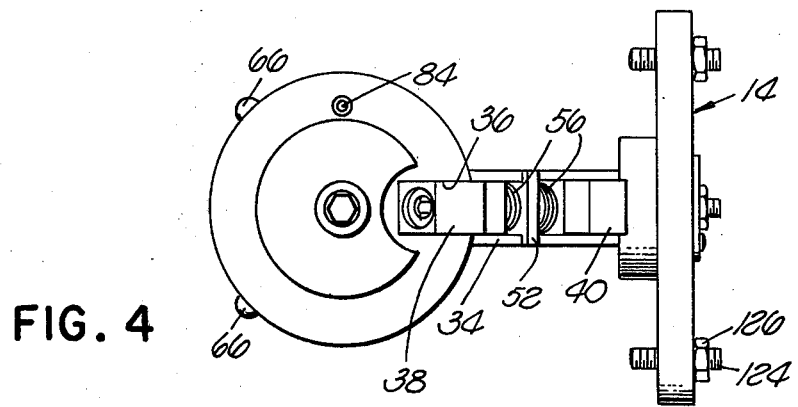
FIG. 4 is a top plan view of the device shown in FIG. 1.
Figure 2:
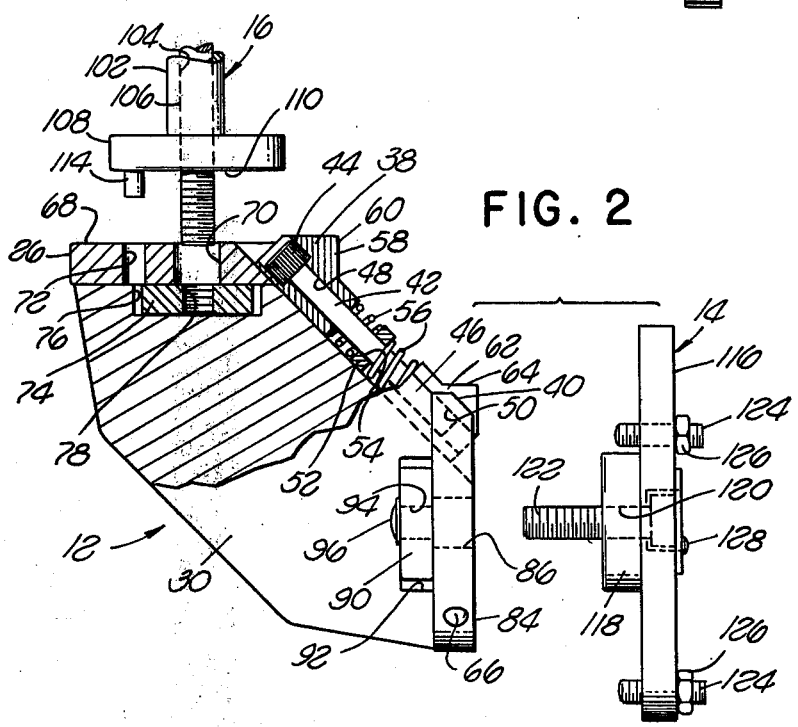
FIG. 2 is a partially exploded side elevational view which is partially broken away to a vertical section along the line 1—1 of FIG. 1.
Figure 5:
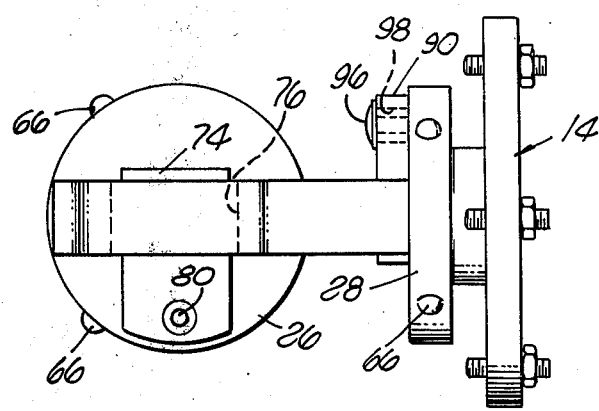
FIG. 5 is a bottom view of the device shown in FIG. 1.

Referring now to the drawings there is illustrated, in FIGS. 1 through 5 thereof, a preferred embodiment of the invention generally designated 10. The embodiment 10 generally comprises a frame 12, a locating plate 14, a shaft apparatus 16 and a centering unit 18. The embodiment 10 is shown in FIG. 1 in place within a 90° pipe fitting, commonly referred to as an "elbow", which is designated therein 20. The pipe elbow 20 is shown with a first open end 22 and a second open end 24 at opposite ends thereof.

The frame 12 comprises a first flange portion 26 and a second flange portion 28 connected to opposite ends of a main portion 30. These components of the frame 12 are desirably constructed of heavy metal stock permanently connected, as by welding. The first flange portion 26 and the second flange portion 28 are each circular in shape and are positioned within perpendicular planes such that the frame 12 may be fitted within the pipe elbow 20 with the first flange portion 26 adjacent to the first open end 22, and the second flange portion adjacent to the second open end 24. The main portion 30 may be constructed of somewhat heavier stock than the flange portions 26 and 28, and is perpendicular thereto. The main portion 30 is small enough to not interfere with the inner wall 32 of the pipe elbow 20 during installation and removal of the frame 12 relative to the pipe elbow 20, and is located within the plane about which the pipe elbow 20 is symmetric. The points at which the first and second flange portions 26 and 28 are nearest to each other are connected by an edge 34 which is linear between those points and which forms angles of 45° with each of the flange portions. The edge 34 is provided with a linear slot 36 of generally square cross-section which passes through the first and second flange portions 26 and 28 at angles of 45°. The linear slot 36 is adapted to closely receive clamping elements 38 and 40 for sliding movement of those elements therealong. A locking bolt 42 is disposed longitudinally within the linear slot 36 and operatively connects the clamping elements 38 and 40. The locking bolt 42 is provided with a head portion 44 and a threaded portion 46 best seen in FIG. 2. The locking bolt 42 passes through an opening 48 such that the head portion 44 is located on the side of the clamping element 38 which is nearest the first flange portion 26, and the threaded portion 46 engages a thread opening 50 of the clamping element 40. The openings 48 and 50 are both directed longitudinally of the linear slot 36 when the clamping elements 38 and 40 are in position within the slot. The opening 48 is counter-sunk at its outer end to receive the head portion 44 of the locking bolt 42 for the engaged condition of said locking bolt. A bolt guide 52 is located within the linear slot 36 at a point midway between its two ends. The bolt guide 52 is perpendicular to the axis of the linear slot 36 and is provided with a guide opening 54 which is adapted to receive the locking bolt 42 when said bolt is in position within the slot. A pair of spring elements 56 are placed about the locking bolt 42 on either side of the bolt guide 52 between the bolt guide and the first and second clamping elements 38 and 40, respectively. The clamping elements 38 and 40 are thus urged toward opposite ends of the linear slot 36 by the spring elements 56 while being confined to a maximum longitudinal extension by the condition of engagement of the locking bolt 42 with the threaded opening 50 in the clamping element 40. The spring elements 56 in conjunction with the bolt guide 52 also serve to maintain the clamping elements 38 and 40 in a symmetric relationship relative to the bolt guide 52. Actuation of the locking bolt 42 toward a condition of further engagement with the threaded opening 50 therefore uniformly draws the clamping elements 38 and 40 together along the linear slot 36. Actuation of the locking bolt 42 in the opposite direction results in separation of the clamping elements 38 and 40.

The clamping element 38 is provided with an engaging portion 58 which projects outward from the linear slot 36 and has an engaging surface 60 which is perpendicular to the outer surface 68 of the first flange portion 26 and faces outward therefrom. The engaging surface 60 thus forms an angle of 45° with the direction of the linear slot 36. Movement of the clamping element 38 along the linear slot 36 therefore results in a component of movement of the engaging surface 60 which is perpendicular to that surface. It is that component of movement outward from the first flange portion 26 which forces the engaging surface 60 against the inner surface of the first open end 22 of the pipe elbow 20 when the locking bolt 42 is tightened. This outward clamping action serves to rigidly locate the first flange portion 26 relative to the first open end 22. The clamping element 40 is provided with an engaging portion 62 having an engaging surface 64 which is functionally identical to the engaging surface 60. The engaging surface 64 is located perpendicular to the outer surface 84 of the second flange portion 28 and faces away therefrom. Movement of the clamping element 40 serves to effectively move the surface 64 radially outwardly from the second flange portion 28 to a condition of clamping engagement with the interior of the second open end 24 of the pipe elbow 20. Actuation of the locking bolt 42 therefore serves to clamp the frame 12 into the pipe elbow 20 adjacent both the first open end 22 and the second open end 24. The spring elements 56 allow the entire clamping mechanism to float relative to the remainder of the frame 12, thereby enabling both ends of the frame 12 to be rigidly clamped by actuation of the single locking bolt 42. In case one of the clamping elements 38 or 40 becomes seated against the interior of the pipe elbow 20 before the other, the spring elements 56 will enable the other clamping element to be further actuated to a condition of complete engagement with the pipe elbow 20.

The flange portions 26 and 28 each include a pair of blunt projections 66 adapted to engage the interior of the two open ends of the pipe elbow 20 for the frame 12 in a clamped condition relative thereto. The use of the blunt projections 66 rather than flange portions of slightly larger diameter enables the frame 12 to more easily clear the interior of the pipe elbow 20 during insertion and removal relative thereto and to space the flange portions therefrom.

The flange portion 26 may be generally circular in shape and is provided with an outer surface 68 which is essentially flat and adjacent to the first open end 22 of the pipe elbow 20. The outer surface 68 is provided with a central enlarged opening 70 extending axially through the first flange portion 26 and a somewhat smaller eccentric opening 72 parallel thereto. The upper end of the linear slot 36 also extends through the outer surface 68 adjacent one edge thereof. A captive nut 74 is located within an opening 76 in the main portion 30 of the frame 12 at a location directly beneath the first flange portion 26. The captive nut 74 is provided with a threaded opening 78 the axis of which is parallel to that of the enlarged opening 70. The captive nut 74 is generally confined within the opening 76 against axial or rotational movement relative thereto, but is free for substantially translational movement between a plurality of different conditions of registration of the threaded opening 78 with the enlarged opening 70. The captive nut 74 is retained within the opening 76 by a screw and washer arrangement 80 which passes through an opening in the captive nut 74 and is threadingly engaged with the underside of the first flange portion 26. The opening is enlarged relative to the diameter of the screw 80 to enable the above-described substantially translational movement of the captive nut 74 relative to the opening 76. The screw and washer arrangement 80 are loose enough relative to the captive nut 74 to allow relative movement thereof. A set screw 84 may be provided at the other end of the threaded opening with which the screw and washer arrangement 80 is engaged to allow the screw and washer arrangement to be tightened thereagainst while not clamping tightly against the captive nut 74.

The second flange portion 28 may be constructed identically to the first flange portion 26 described above to provide an outer surface 84 adjacent the second open end 24 of the pipe elbow 20 with a central enlarged opening 86 and an eccentric opening 88 therethrough. A captive nut 90 is provided within an opening 92 in the frame 12 to limit relative movement of the captive nut 90 to substantially translational movement within a plane parallel to the outer surface 84. The captive nut 90 is provided with a threaded opening 94 the axis of which is parallel to the axis of the enlarged opening 86. The captive nut 90 is retained in the opening 92 by a screw and washer arrangement 96 which passes through an opening in the captive nut 90 to a threading engagement with the second flange portion 28. A set screw 100 is provided to lock the screw and washer arrangement 96 relative to the second flange portion 28 without clamping against the captive nut 90. The captive nut 90 is therefore movable between a plurality of conditions of registration with the enlarged opening 86.

The shaft apparatus 16 generally comprises a shaft element 102 having an axial opening 104 adapted to receive a draw bar bolt 106 from its upper end. The shaft element 102 includes a radial flange 108 having a lower surface 110 which is perpendicular to the axis of the shaft element 102. The draw bar bolt 106 may be provided with a hex head 112 at its upper end and is sufficiently long to extend entirely through the axial opening 104 and project a distance past the radial flange 108 which is greater than the thickness of the first and second flange portions 26 and 28. The draw bar bolt 106 is threadingly engageable with the threaded openings 78 and 94 of the captive nuts 74 and 90, respectively. The shaft apparatus 16 may therefore be positioned with its radial flange 108 against one of the flange portions 26 or 28 to enable the draw bar bolt 106 to engage one of the captive nuts 74 or 90. The radial flange 108 is provided with a pin element 114 which is engageable with one of the eccentric openings 72 or 88 in this condition, to prevent the shaft element 102 from rotating relative to the frame 12. The draw bar bolt 106 may be loosely engaged with one of the captive nuts 74 or 90 to allow movement of the shaft apparatus 16 within a radial plane between positions which correspond to the various positions of said captive nut. The draw bar bolt 106 may be tightened in any one of these positions to restrain the shaft apparatus 16 for further movement. It is clear from the above description that the shaft apparatus 16 may be applied to either the first flange portion 26 or the second flange portion 28 for adjustable attachment relative thereto. The shaft apparatus 16 may further be applied first to one of the flange portions 26 or 28 and then to the other without removing or relocating the frame 12 relative to the pipe elbow 20.

The locating plate 14 comprises a disc 116 having a diameter greater than the inside diameter of the pipe elbow 20 and a spacing element 118 which is co-axial therewith and has a diameter less than the inside diameter of the pipe elbow 20. The locating plate 14 is provided with an axial opening 120 which is counter-sunk at its end adjacent the disc 116 to receive a bolt 122 extending therethrough. The bolt 122 is adapted to engage the threaded opening 94 of the captive nut 90 for the locating 14 positioned against the second flange portion 28. The locating plate 14 may be fixed relative to the frame 12 by tightening the bolt 122. The width of the spacing element 118 is designed to cause the disc 116 to abut the second open end 24 of the pipe elbow 20 for the frame 12 in its condition of proper alignment within the pipe elbow 20. The locating plate 14 thus enables quick and accurate alignment of the frame 12 within the pipe elbow 20 prior to locking the frame 12 therein through actuation of the locking bolt 42. The locating plate 14 may be provided with a plurality of adjusting screws 124 threaded through the disc 116 at a plurality of circumferential points to contact the second open end of the pipe elbow 20. The adjusting screws 124 may therefore be adjusted to space the locating plate 14 from the second open end 24 as desired to compensate for a poorly shaped fitting or to machine one or both of the pipe ends at an angle which differs somewhat from the standard. The adjusting screws 124 may be provided with locking nuts 126 to secure them in a desired position. The bolt 122 may be a cap screw which is retained within the counter-sunk portion of the axial opening 120 by a small retaining screw 128, to allow rotation of the bolt 122 while retaining it axially in place within the opening 120.

The centering unit 18 comprises a central annular portion 130 which is slidingly engageable with the shaft element 102 and has three similar centering vanes 132 extending longitudinally thereof and radially therefrom. Each of the centering vanes 132 is provided at its lower end with a tapered portion 134 to engage the inner edge of an open end of the pipe elbow 20 and to urge the shaft apparatus 16 toward the center of that open end for the centering unit positioned on the shaft element 102 with the tapered portions 134 pressed toward the frame 12. Each of the centering vanes 132 is provided at its other end with an undercut portion 136 forming a longitudinal inward facing tapered surface which progresses radially outward from the annular portion 130 in the direction away from the remainder of the centering unit 18. The undercut portions 136 are positioned to engage the outer edge of an open end of the pipe elbow 20 and to urge the shaft apparatus 16 toward the center of the open end for the centering unit positioned on the shaft element 102 with the undercut portions 136 pressed toward the frame 12. The shaft apparatus 16 may thus be centered while in a loosened condition relative to the frame 12 by merely passing the centering unit 18 thereover and pressing it toward the frame 12. The tapered edge of the centering unit which first contacts the open end of the pipe elbow 20 will cause a net radial force toward or away from that point on the open end to be exerted on the shaft apparatus 16. The shaft apparatus will thus be moved to the point where all three vanes contact the open end simultaneously, at which point the apparatus will be centered relative thereto. The draw bar bolt 106 may then be tightened to maintain this condition. The provision of undercut portions 136 as well as tapered portions 134 allows the shaft apparatus to be accurately centered even if the inner or outer edge of the particular open end of the pipe elbow 20 is somehow flawed or out of shape. The centering operation can be performed accurately if at least one of those edges is satisfactory.

In operation, the frame 12 is fitted within the pipe elbow 20 with the clamping elements 38 and 40 in their radially retracted condition. The locking bolt 42 is then actuated to snug the clamping elements 38 and 40 against the interior of the pipe element 20 while the frame 12 is held with the first and second flange portions 26 and 28 adjacent and roughly parallel to the first and second open ends 22 and 24 of the pipe elbow 20, respectively. The locating plate 14 is then fixed relative to the frame 12 by engagement of the bolt 122 with the captive nut 90. The locking bolt 42 may then be loosened slightly to enable shifting of the frame 12 to a condition wherein the locating plate 14 is flush with the second open end 24 of the pipe elbow 20. The locking bolt 42 is then securely tightened to lock the frame 12 in that condition, wherein the frame 12 is symmetrically located within the frame 12. The adjusting screws 124 enable the operator either to correct for a malformed pipe fitting or set up the embodiment 10 to support a pipe machining tool for rotation along an axis which deviates somewhat from that ordinarily desired. After the frame 12 is properly secured within the pipe elbow 20, the shaft apparatus 16 is loosely engaged with the captive nut 74 such that the shaft element 102 projects outward from the first flange portion 26 along an axis perpendicular to the surface thereof. For a properly formed pipe elbow and the standard setting of the adjusting screws 124, the shaft element is also perpendicular to the first open end 22 of the pipe elbow. In this untightened condition, the shaft element 102 is movable within a radial plane relative to the first flange portion 26 between a plurality of positions adjacent to and including the center of the first open end 22 of the pipe elbow 20. The draw bar bolt 106, the pin element 114, and the captive nut 74 are each free for limited movement which corresponds to the movement of the shaft element 102. The centering unit 18 is then fitted over the shaft apparatus 16 such that either the tapered portions 134 or the tapered surfaces of the undercut portions 136 will contact the open end of the pipe to center the shaft apparatus 16 relative thereto. The draw bar bolt 106 may then be tightened to lock the shaft apparatus in the centered condition. At this point the embodiment 10 is fully installed and aligned, and is ready for use to mount a pipe machining tool for rotation relative to the first open end of the pipe elbow 20. If it is also desired to machine the second open end 24 of the pipe elbow 20, the shaft apparatus 16 is merely removed from the first flange portion 26 and applied to the second flange portion 28 in place of the locating plate 14. The draw bar bolt 106 is therefore engaged with the captive nut 90 and is centered relative to the second open end of the pipe elbow 20 with the centering unit 18.

It can be seen from the above discussion that the embodiment 10 is useful to mount a pipe machining tool for rotation relative to one or both ends of a pipe elbow without the necessity for removal or relocation of its main frame 12 between machining operations. A pair of machined pipe elbow ends obtained with the aid of the apparatus 10 are generally more precisely perpendicular than two cuts obtained using an apparatus which must be completely readjusted before a second end can be machined. The double process using the embodiment 10 is also easier and faster.

Figure 6:
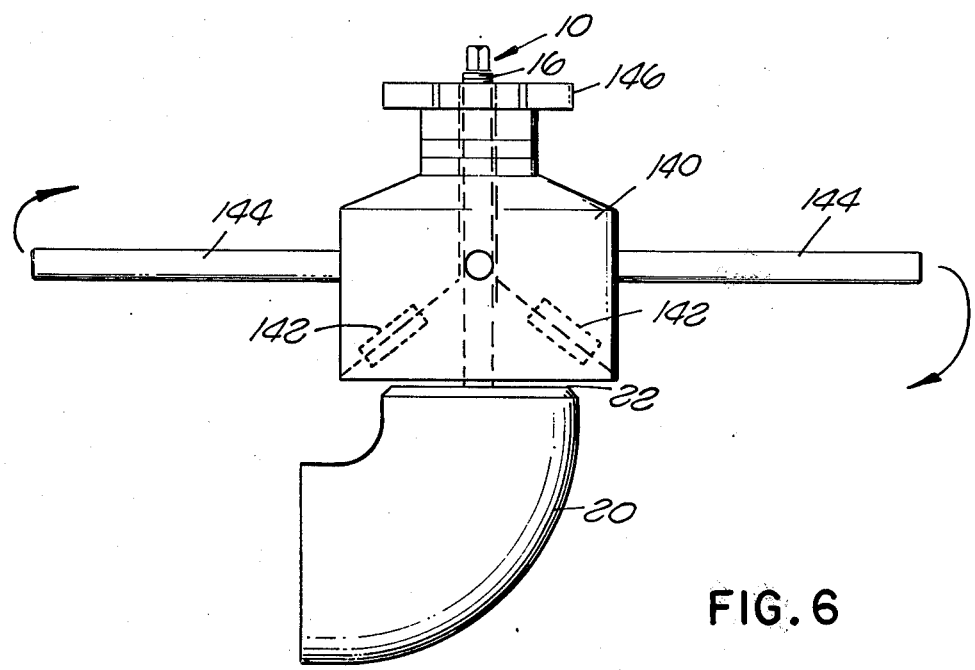
FIG. 6 is a side elevational view of the device shown in FIG. 1 in place within a pipe elbow and supporting a pipe beveling tool for rotation thereabout.

FIG. 6 illustrates generally a pipe elbow 20 into which the embodiment 10 has been installed and adjusted, and to which embodiment a pipe beveling tool 140 is mounted. The pipe beveling tool 140 is mounted for rotation about the shaft apparatus 16 and includes cutters 142 mounted at an angle relative to the axis of rotation and adapted to engage the first open end 22 of the pipe elbow 20. The operator merely rotates the pipe beveling tool 140 manually using the handles 144 to cause the cutters 142 to bevel the first open end 22. A large nut 146 may engage a threaded outer surface of the shaft apparatus 16 near its axially outer end to force the cutters 142 against the first open end 22 as the pipe beveling tool 140 rotates. In this way, the cutters 142 may be advanced axially relative to the first open end 22 as desired.

Figure 7:
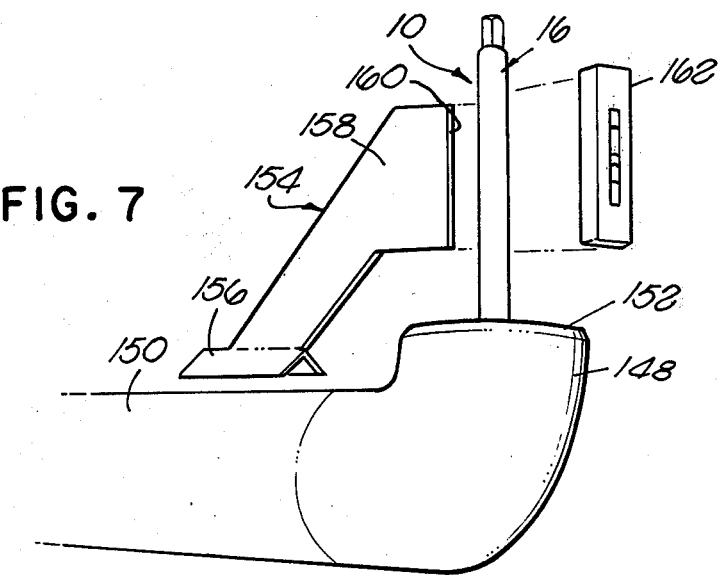
FIG. 7 is a side elevational view of the device shown in FIG. 1 installed within a pipe elbow fixed at one end to a run of pipe.

FIG. 7 illustrates the embodiment 10 installed within a pipe elbow 148 which has been welded at one end to a run of pipe 150. The locating plate 14 is therefore not able to be used at a second end of the pipe, and the mandrel shaft 16 must be otherwise aligned along the open end 152 of the pipe elbow 148. A squaring gauge 154 is used to orient the shaft apparatus 16 in a direction perpendicular to the run of pipe 150. The squaring gauge includes a short section of angle iron 156 connected to a plate 158. The section of angle iron 156 is positioned on the surface of the run of pipe 150 with the outer edges of its flange portions receiving that surface and directed parallel to the run of pipe. The plate 158 has a gauge edge 160 which is perpendicular to the direction of the angle iron and is adapted to be placed adjacent the shaft apparatus 16 while the section of angle iron 156 is applied to the run of pipe 150. The frame 12 may then be easily adjusted within the pipe elbow 158 such that the shaft apparatus 60 is parallel to the gauge edge 160 and is therefore perpendicular to the run of pipe 150. This is accomplished with the locking bolt 42 in a somewhat loosened condition. The alignment of the shaft apparatus 60 is completed with the aid of a spirit level 162.

While the above detailed description deals on its face with a mandrel adapted for use in a pipe elbow having an angle of 90°, the description is equally applicable to pipe "bends" of other angles. the critical distinction in cases of pipe bends not equal to 90° is the difference in the angle between the first flange portion 26 and the second flange portion 28. That angle is then equal to the angle of the fitting to which it is to be applied, with the first flange portion adjacent to the first open end of the pipe bend and and the second flange portion adjacent to the second open end of the pipe bend for the frame positioned within the pipe bend. The precise angles formed between the linear slot 36 and the first and second flange portions differ accordingly, but the general symmetric relationship does not.

This concludes the description of the preferred embodiments of the present invention. From the above, it can be seen that there has been provided an improved mandrel arrangement to mount pipe machining tools for rotation relative to an open end of a pipe elbow or other bend, which may be used in a shop or in the field to quickly, accurately and economically machine an end of a pipe bend having either both ends open or one end open and the other welded to a run of pipe. In the case of a pipe bend having two open ends, the ends may be similarly machined relative to two axes, repectively, having a predetermined angular relationship. This is made possible by the fact that the main frame of the mandrel arrangement need not be removed or adjusted relative to the pipe bend between the operations on the two ends.

Those skilled in the art may find variations and adaptations of the present invention and the appended claims are intended to cover all such variations and adaptations falling within the true scope and spirit of the invention.

I claim:

1. A mandrel for mounting a pipe machining tool for rotation relative to at least one end of a pipe bend to be machined, which comprises:
    a frame means having a main portion and first and second flange portions fixed to opposite ends of said main portion, an outer surface of said first flange portion in a first plane, an outer surface of said second flange portion in a second plane intersecting said first plane at a predetermined angle, said frame positionable within said pipe bend with said outer surface of said first flange portion adjacent to a first end of said pipe bend and said outer surface of said second flange portion adjacent to a second end of said pipe bend;
    locking means connected to said frame and adjustable between a first radially retracted condition in which said frame is free for movement relative to said pipe bend, and a second radially extended condition in which said frame exerts an outward force against the interior of said pipe bend to frictionally retain said frame against movement relative thereto;
    mandrel shaft means adapted to receive said pipe machining tool for rotation about the axis of said mandrel shaft means; and
    means for adjustably mounting said mandrel shaft means to at least one of said first and second flange portions of said frame means to provide said mandrel shaft means extending substantially perpendicularly outward from said outer surface of said at least one of said first and second flange portions;
    whereby said mandrel shaft means may be adjusted to predetermined positions on said frame means to receive said pipe machining tool for rotation thereabout.

2. A mandrel as recited in claim 1 in which said means for adjustably mounting said mandrel shaft means comprises an axial threaded portion at one end of said mandrel shaft means, a first central opening in said outer surface of said first flange portion and a first nut adapted to engage said axial threaded portion, said first central opening having a substantially greater diameter than said axial threaded portion and adapted to receive said axial threaded portion in a direction perpendicular to said outer surface of said first flange portion for passage therethrough to a position of engagement with said first nut, whereby different positions of said axial threaded portion relative to said first central opening within a first radial plane correspond to said predetermined positions of said mandrel shaft means on said frame.

3. A mandrel as recited in claim 2 in which said first nut is mounted to said frame and is restrained thereby against all movement except substantially translational relative movement parallel to said first radial plane, said first nut being carried by said axial threaded portion as it moves between said different positions for the condition of said mandrel shaft means mounted to said first flange portion.

4. A mandrel as recited in claim 3 wherein said predetermined angle is 90 degrees.

5. A mandrel as recited in claim 3 which includes a centering unit adapted to be slidingly received on said mandrel shaft means, having at least three similar centering vanes extending longitudinally of and radially from said mandrel shaft means and adapted to engage at least one of said first and second ends of said pipe bend for said centering unit received on said mandrel shaft means and pressed toward said pipe bend, and to urge said mandrel shaft means toward the center of said at least one of said first and second ends of said pipe bend.

6. A mandrel as recited in claim 5 wherein the outer radial extremity of each of said three similar centering vanes near one end is longitudinally tapered toward the axis of said centering unit to engage the radially inner edge of said at least one of said first and second ends of said pipe bend.

7. A mandrel as recited in claim 6 wherein each of said three similar centering vanes is undercut at its other end to form a longitudinal inward facing tapered surface which progresses outward from the axis of said centering unit in the direction of said other end and is engagable with the radially outer edge of said at least one of said first and second ends of said pipe bend.

8. A mandrel as recited in claim 3 which includes a locating plate removably attached to said second flange portion adjacent said second end of said pipe bend such that a portion of said locating plate abuts said second end of said pipe bend to locate said frame relative thereto.

9. A mandrel as recited in claim 3 wherein said locking means comprises a screw thread mechanism adapted to force at least one movable locking element against the interior of said pipe bend.

10. A mandrel as recited in claim 9 wherein said screw thread mechanism comprises two movable locking elements connected by a single bolt for actuation of said movable locking elements in opposite directions by rotation of said single bolt to bear against the interior of said pipe bend.

11. A mandrel as recited in claim 10 wherein the angles formed between the axis of said single bolt and said outer surface of said first flange portion is substantially equal to that formed between said axis and said outer surface of said second flange portion.

12. A mandrel as recited in claim 9 in which said means for adjustably mounting said mandrel shaft means includes a second central opening in said outer surface of said second flange portion and a second nut adapted to engage said axial threaded portion, said second central opening having a substantially greater diameter than said axial threaded portion and adapted to receive said axial threaded portion for passage therethrough to a position of engagement with said second nut, whereby various positions of said axial threaded portion relative to said second central opening within a second radial plane correspond to said predetermined positions of said mandrel shaft means on said frame.

13. A mandrel shaft means as recited in claim 12 in which said second nut is mounted to said frame and is restrained thereby against all movement except substantially translational relative movement parallel to said second radial plane, said second nut being carried by said axial threaded portion as it moves between said various positions for the condition of said mandrel shaft means mounted to said second flange portion.

14. A mandrel as recited in claim 13 wherein said predetermined angle is 90 degrees.

15. A mandrel as recited in claim 14 which includes a generally circular locating plate removably attached to said second flange portion adjacent said second end of said pipe bend such that said generally circular locating plate abuts said second end of said pipe bend to locate said frame relative thereto.

16. A mandrel as recited in claim 15 wherein said generally circular locating plate is removably attached to said second flange through a central bolt engageable with said second nut and includes a plurality of projections which are adjustable in length and are positioned to space a portion of said generally circular locating plate a desired distance from said second end of said pipe bend, whereby the orientation of said frame relative to said second end of said pipe bend may be varied.

17. A mandrel as recited in claim 16 wherein said mandrel shaft means includes a radial flange adjacent said axial threaded portion and positioned such that the lower surface of said radial flange abuts said outer surface of one of said first and second flange portions for said mandrel shaft means mounted to said one of said first and second flange portions, whereby said mandrel shaft means is maintained perpendicular to said outer surface.

18. A mandrel as recited in claim 17 wherein said radial flange includes an eccentric pin projecting downward from said lower surface to engage an opening in said outer surface to prevent said mandrel shaft means from rotating in a mounted condition on said frame.

19. A mandrel as recited in claim 18 wherein said outer surfaces of said first and second flange portions are essentially circular.

20. A mandrel as recited in claim 19 wherein said first and second flange portions include a plurality of blunt radially outward projections adapted to contact the interior of said pipe bend for the condition of said frame within said pipe bend, and thereby to space said frame therefrom.

21. A mandrel as recited in claim 20 wherein a portion of said mandrel shaft means is externally threaded to operatively engage said pipe machining tool.

22. A method of mounting a pipe tool for rotation relative to a pipe bend for performing a machining operation thereon which comprises:
placing a mandrel support frame into a first open end of said pipe bend such that a first outward facing surface portion of said mandrel support frame is adjacent said first open end;
locking said mandrel support frame in place relative to said pipe bend;
loosely engaging a threaded section of a mandrel shaft means with a first captive nut within said mandrel support frame to provide said mandrel shaft means projecting perpendicularly from said first outward facing surface portion and able to move between a plurality of predetermined positions thereon;
centering said mandrel shaft means relative to said first open end;
locking said mandrel shaft means in place relative to said pipe elbow by tightening said threaded section into said captive nut; and
mounting said pipe tool for rotation relative to said mandrel shaft means.

23. The method of claim 22 in which the step of centering said mandrel shaft means comprises sliding a centering device having surfaces tapered relative to its axis over said mandrel shaft means to a position wherein said tapered surfaces engage said first open end to urge said mandrel shaft means toward the center of said first open end.

24. The method of claim 22 in which the step of locking said mandrel support frame in place relative to said pipe bend comprises actuating a threaded mechanism to urge at least one locking element against the interior of said pipe bend to frictionally retain said mandrel support frame against movement relative thereto.

25. The method of claim 24 in which the step of placing a mandrel support frame into a first open end of said pipe bend includes the steps of attaching a locating plate to said mandrel support frame from a second open end of said pipe bend and orienting said mandrel support frame relative to said pipe bend to provide said locating plate abutting said second open end, whereby said mandrel support frame is properly located relative thereto.

26. The method of claim 25 in which the step of centering said mandrel shaft means comprises sliding a centering device having surfaces tapered relative to its axis over said mandrel shaft means to a position wherein said tapered surfaces engage said first open end to urge said mandrel shaft means toward the center of said first open end.

27. The method of claim 26 wherein the step of placing a mandrel support frame into a first open end of said pipe bend includes orienting said mandrel support frame such that a second outward facing surface portion of said mandrel support frame is adjacent a second open end of said pipe bend.

28. The method of claim 27 which further includes the steps of:
disengaging said shaft means and said locating plate from said mandrel support frame after the machining operation on said first open end has been completed;
loosely engaging said threaded section with a second captive nut within said mandrel support frame adjacent said second open end of said pipe bend, to provide said mandrel shaft means projecting perpendicularly from said second outward facing surface portion;

centering said mandrel shaft means relative to said second open end;

locking said mandrel shaft means in place relative to said pipe bend by tightening said threaded section into said second captive nut; and mounting said pipe tool for rotation relative to said mandrel shaft means.

* * * * *